(12) United States Patent
Sawyers

(10) Patent No.: US 8,190,933 B2
(45) Date of Patent: May 29, 2012

(54) BI-DIRECTIONAL CONTROL OF POWER ADAPTER AND LOAD

(75) Inventor: Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 12/598,236

(22) PCT Filed: May 1, 2008

(86) PCT No.: PCT/US2008/062232
§ 371 (c)(1),
(2), (4) Date: Oct. 30, 2009

(87) PCT Pub. No.: WO2008/137553
PCT Pub. Date: Nov. 13, 2008

(65) Prior Publication Data
US 2010/0077237 A1    Mar. 25, 2010

Related U.S. Application Data

(60) Provisional application No. 60/915,117, filed on May 1, 2007.

(51) Int. Cl.
*G06F 1/00* (2006.01)
(52) U.S. Cl. ....................................................... 713/300
(58) Field of Classification Search .................... 713/300
See application file for complete search history.

(56) References Cited

U.S. PATENT DOCUMENTS

| | | | |
|---|---|---|---|
| 6,459,175 B1 | 10/2002 | Potega | |
| 6,950,950 B2 | 9/2005 | Sawyers et al. | |
| 2003/0144817 A1* | 7/2003 | Smith et al. | 702/183 |
| 2006/0020833 A1* | 1/2006 | Critz et al. | 713/300 |
| 2006/0085658 A1 | 4/2006 | Allen et al. | |

FOREIGN PATENT DOCUMENTS
WO    WO2006130877    12/2006

OTHER PUBLICATIONS

Intellectual Property Office, Examination Report under Section 18(3), Appln No. 0919525.6, date of mailing Jun. 10, 2011, 3 p.
International Search Report and Written Opinion dated Aug. 29, 2008, pp. 10.
State Intellectual Property Office, P.R. China, Second Office Action, Appln. No. 200880014133.7, date of mailing Jul. 28, 2011, 3 p.
Translation of State Intellectual Property Office, P.R. China, Second Office Action, Appln. No. 200880014133.7, date of mailing Jul. 28, 2011, 5 p.
DE Office Action, Appln No. 112008001225.3, date of mailing Jan. 13, 2012, 5 p.
Translation of DE Office Action, Appln No. 112008001225,3, date of mailing Jan. 13, 2012, 2 p.

* cited by examiner

*Primary Examiner* — Mohammed Rehman

(57) ABSTRACT

A system comprises a computer and an external power adapter configured to be connected to the computer to provide power to the computer. The computer comprises a computer control circuit that generates a computer control signal that is provided to the external power adapter and causes a change in an output voltage of the external power adapter. The external power adapter comprises an adapter control circuit that generates an adapter control signal that is provided to the computer and causes the computer to change its power draw. The computer and adapter control circuits generate the control signals on a common conductor interconnecting the computer and the external power adapter.

19 Claims, 2 Drawing Sheets

BI-DIRECTIONAL CONTROL OF POWER ADAPTER AND LOAD

CROSS-REFERENCE TO A RELATED APPLICATION

The present application claims the benefit of, and incorporates by reference, provisional application Ser. No. 60/915,117, filed May 1, 2007, and entitled "Bi-Directional Control of Power Adapter and Load."

BACKGROUND

Some computers, such as notebook computers, have an external power adapter that converts alternating current (AC) voltage to direct current (DC) voltage for consumption by the computer. The DC voltage provided to the computer can be used to operate the logic circuits in the computer as well as to charge a battery. Different voltages may be required for battery charging as opposed to operating the computer's logic circuits. Additionally, a computer may be able to draw more current than the power adapter is rated to provide.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of two or more components. A system may comprise, for example, the combination of a server and a client communicatively coupled thereto, or a server alone, a client alone, or a subsystem within a computer. The term "battery" refers to a single battery cell or multiple cells packaged as a battery pack.

DETAILED DESCRIPTION

Figure 1:
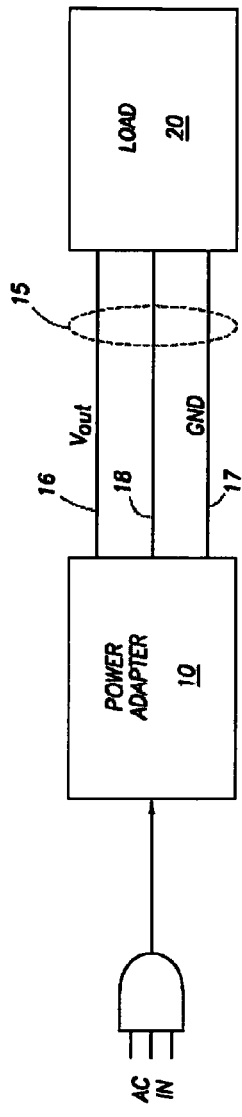
FIG. 1 shows a system diagram illustrating a power adapter coupled to a load in accordance with embodiments of the invention.
Figure 2:
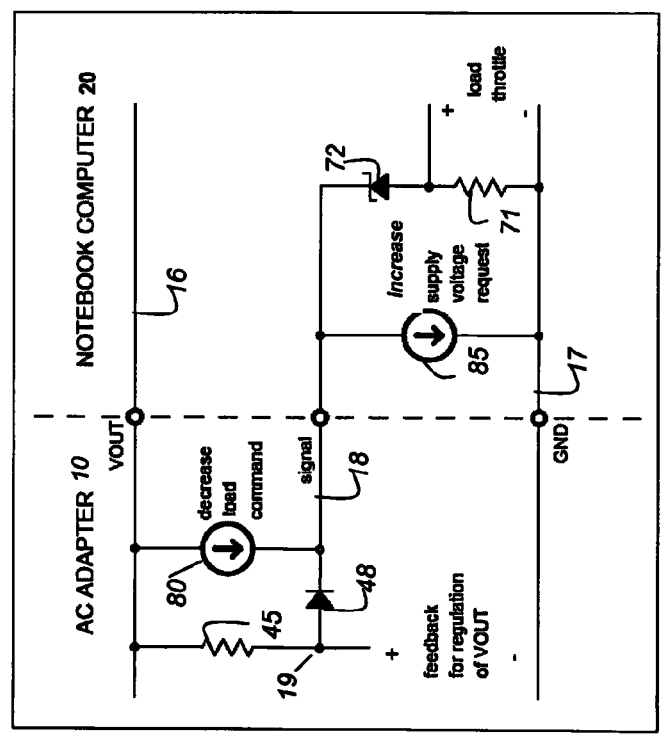
FIG. 2 shows a block diagram of the power adapter and load depicted in FIG. 1.
Figure 3:
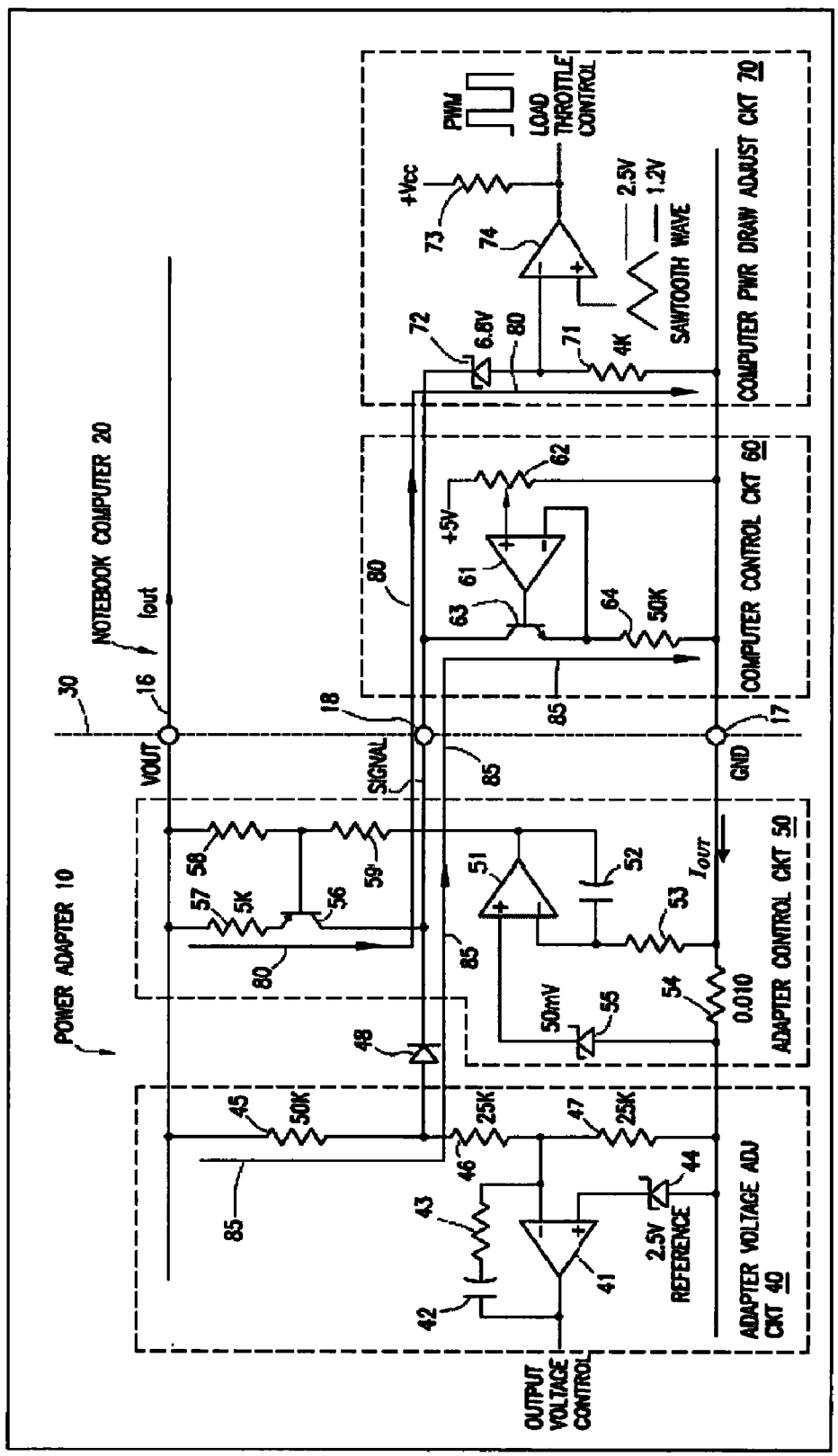
FIG. 3 shows a detailed schematic of the power adapter and load depicted in FIG. 1.

FIG. 1 illustrates an embodiment comprising an AC power adapter 10 coupled to a load 20 via an electrical cable 15. The AC power adapter 10 is external to the load, at least in the embodiment shown in FIG. 1, and converts AC voltage (e.g., 120 VAC) to one or more suitable DC voltages (14 VDC, 19 VDC, etc.) for operating the load 20. The load 20 may comprise any type of electrical system. In some embodiments, the load 20 comprises a computer (e.g., a notebook computer). In the examples of FIGS. 2 and 3 provided below, the load 20 is referred to as a notebook computer, but the load could comprise systems other than notebook computers. In some embodiments, the load 20 is battery-operated and comprises a rechargeable battery that is recharged by power provided the AC power adapter 10 (hereinafter "power adapter") via cable 15.

In accordance with at least some embodiments, the power adapter 10 and load 20 comprise circuitry that enables each such device to control the other. The power adapter 10 causes the load 20 to change (e.g., reduce) its power draw as the power draw from the power adapter 10 nears and/or exceeds the power rating, or other threshold, of the power adapter. That is, if the load 20 begins to draw more power than the power adapter 10 can safely provide, the power adapter provides a control signal to the load to reduce its power consumption. The load 20 responds to the signal initiated by the power adapter 10 by reducing its power consumption. This reduction can be in accordance with any of a variety of power-reducing techniques. Examples comprise dimming a display of the load, throttling back a processor of the load, spinning down a rotatable storage medium (e.g., hard disk drive), ceasing battery charging, etc. The power adapter 10 also permits the load 20 to increase its power draw if the load's power draw is not at or in excess of the power adapter's threshold.

The load 20 is also able to control the power adapter 10. In at least some embodiments, the load 20 comprises host logic (e.g., processor, memory, etc.) as well as a rechargeable battery. The voltage used to recharge the load's battery may be a different voltage level than the voltage used to power the load's host logic. While some loads may comprise battery charging circuitry to generate the appropriate battery charging voltage, the load 20 of various embodiments does not necessarily comprise battery charging circuitry. In such embodiments, the power adapter 10 provides the voltage necessary to charge the load's rechargeable battery. Moreover, the power adapter 10 selectively provides at least two different voltages to the load 20. One voltage level is suitable for operating the host logic in the load 20 and another voltage level is suitable for charging the load's battery. The load 20 causes a control signal to be generated between the power adapter 10 and load 20 which, in turn, causes the output voltage provided by the power adapter 10 to the load 20 to change, for example, to increase if the load 20 requires a higher voltage or to decrease if the load 20 is operable with a lower voltage.

The cable 15 connecting the power adapter 10 to the load 20 comprises at least three conductors in various embodiments. In the embodiment of FIG. 1, the cable comprises conductors 16, 17, and 18. Conductor 16 is used to provide the power adapter's output voltage (Vout) to the load 20 and conductor 17 is a return (ground). In accordance with various embodiments, the power adapter 10 and load 20 cause control signals to be provided between the power adapter and load to enable one such device to control the other as described above. Such control signals are provided between the power adapter 10 and load 20 on a common conductor 18. Thus, the power adapter 10 and load 20, at least in part, control each other via control signals provided therebetween on a common conductor.

The control principle is illustrated in FIG. 2. Vout 16 is set to the desired voltage by regulating the voltage at the regulation feedback node 19. While the power adapter 10 is not commanding a decrease in load current, the decrease load command current signal 80 is zero. While the notebook 20 is not requesting an increase in adapter voltage, the increase supply voltage request current signal 85 is zero. In this state, the voltage at regulation feedback node 19 is lower than the zener voltage of zener diode 72 in the notebook computer, so zener 72 is not conducting, and the voltage across resistor 71 is zero. Likewise diode 48 is not conducting, so the only current through resistor 45 is that drawn by the feedback for regulation of Vout 16. The notebook 20 may request an increase in adapter voltage, by increasing current signal 85. This current flows through resistor 45 and diode 48, resulting in an increase in Vout 16. Alternately, the adapter 10 may command a decrease in load current drawn by the notebook 20, by increasing current signal 80. Current 80 then flows through zener diode 72 and resistor 71, causing a voltage across resistor 71, which commands the notebook 20 to decrease, or throttle, its power draw. Should the load decrease command current 80 occur while current signal 85 is flowing, the signal 80 simply subtracts from the signal 85, thus reducing the effect of the increase supply voltage request signal 85. The difference between them is used to control power adapter voltage 16. This is a seamless transition, requiring no switching or additional control signals. No logic is required to separately control or modify the signals 80 and 85 to assert one signal while holding the other signal inactive—both signals can co-exist simultaneously and on the same conductor 18. By design, the maximum level of the decrease load command current 80 is greater than the maximum level of the increase supply voltage request signal 85, so the adapter can overcome any request to increase voltage and still decrease load, as prevention of overload is higher priority than increasing power adapter voltage.

FIG. 3 shows illustrative circuitry in the power adapter 10 and load 20 (e.g., notebook computer). The circuitry to the left of dashed dividing line 30 represents at least some of the circuitry provided in the power adapter 10, while circuitry to the right of the dashed dividing line 30 represents at least some of the circuitry provided in the notebook computer 20.

The circuitry of the power adapter 10 comprises an adapter voltage adjust circuit 40 coupled to an adapter control circuit 50. The adapter voltage adjust circuit comprises operational amplifier 41, capacitor 42, resistors 43 and 45-47, and zener diode 44. Adapter control circuit 50 comprises operational amplifier 51, resistors 53-54, and 56-59, capacitor 52, zener diode 55, and transistor 56. A diode 48 is provided coupling the adapter voltage adjust circuit 40 to the adapter control circuit 50.

The notebook computer circuitry shown in FIG. 3 comprises a computer control circuit 60 coupled to a computer power draw adjust circuit 70. The computer control circuit 60 comprises an operational amplifier 61, resistor 64, transistor 63, and potentiometer 62. The computer power draw adjust circuit 70 comprises an operational amplifier 70, resistors 71 and 73 and zener diode 72.

The component values listed in FIG. 3 are illustrative of an embodiment. The component values can be different from that shown.

As described above, the power adapter 10 causes the notebook computer 20 to change (e.g., reduce) its power draw as the power draw from the power adapter 10 nears and/or exceeds the power rating, or other threshold, of the power adapter. The circuitry that performs this functionality comprises circuitry in both the power adapter 10 and the notebook computer 20, namely the adapter control circuit 50 working in concert with the computer power draw adjust circuit 70.

Current from the power adapter 10 (Iout) flows through conductor 16 and to the notebook computer 20, and returns via ground conductor 17. Resistor 54 comprises a sense resistor, that is, a resistor with a low resistance value (e.g., 0.01 ohms). The resistance is low enough so as not to disturb the operation of the circuit. The voltage across the resistor is proportional to the output current of the power adapter 10. The zener diode 55 comprises, for example, a 50 millivolt (mV) voltage reference. The voltage generated across sense resistor 54 is provided, in part via the zener diode 55 to the non-inverting (+) and inverting (−) terminals of operational amplifier 51. The zener diode voltage is applied to the non-inverting terminal. If the voltage across sense resistor 54 is less than 50 mV, the output of operational amplifier 51 goes high. When the current Iout is high enough so as to generate a voltage across sense resistor 54 in excess of 50 mV, the voltage applied to the inverting terminal of operational amplifier 51 will be greater than the 50 mV voltage applied to the non-inverting terminal via zener diode 55. When the inverting terminal voltage becomes greater than the non-inverting terminal, the output of operational amplifier 51 goes low.

The values of the zener diode 55 (e.g., 50 mV) and the sense resistor (0.01 ohms) is chosen so that the output voltage of operational amplifier decreases when the power adapter's output current Iout begins to near or exceed a rating associated with the power adapter. Thus, a low voltage at the output of the operational amplifier 51 indicates that the power adapter 10 is being driven, or about to be driven, past its maximum current rating.

In the embodiment of FIG. 3, the transistor 56 comprises a PNP transistor. A PNP transistor is turned on (i.e., conducts current from its collect to emitter) upon application of low base-to-emitter voltage and is turned off upon application of a high base-to-emitter voltage (i.e., lower or higher than a threshold voltage). When the power adapter's output current Iout is less than the adapter's rating, the current through sense resistor 54 is low enough relative to the voltage of zener diode 55 so that the output voltage of the operational amplifier 51 is high. The operational amplifier's high output voltage forces the PNP transistor 56 to be off.

However, if the current through the sense resistor 54 is high (relative to the zener diode's voltage), the output voltage of the operational amplifier 51 decreases which drives the PNP transistor 56 to turn on. While on, current 80 flows through resistor 57, transistor 56, across conductor 18, and through zener diode 72 and resistor 71 in the computer power draw adjust circuit 70. The magnitude of the current 80 is proportional to the difference between the power adapter's output current Iout and the rating threshold.

In some embodiments, a sawtooth waveform is generated (via circuitry not shown in FIG. 3) and provided to the non-inverting input terminal of comparator 74. In the example shown in FIG. 3, the minimum voltage of the sawtooth waveform is 1.2V and the maximum voltage is 2.5V. The voltage across resistor 71 is provided to the comparator's inverting terminal. The output voltage of the comparator 74 is high if the voltage on the non-inverting terminal exceeds the voltage on the inverting terminal, and low otherwise. When current flows through transistor 56 and conductor 18, the current 80 has a magnitude that is such that the voltage generated across resistor 71 is greater than 1.2V. The voltage across resistor 71 is proportional to the magnitude of current 80 and thus increases as the current 80 increases and, indirectly, as the adapter's output current Iout increases. The output voltage from comparator 74 comprises a pulse train (i.e., series of digital pulses) whose duty cycle is controlled by the magnitude of the voltage across resistor 71 (and thus current 80 and the power adapter's output current Iout).

The pulse train output of comparator 74 comprise a pulse-width modulated (PWM) signal controlled indirectly by the power adapter's output current Iout. The PWM signal from comparator 74 is used by the computer power draw adjust circuit 70 to cause the notebook computer 20 to adjust its power draw (e.g., throttling the clock speed of a processor, dimming a display, etc.). The smaller the pulse width, the lower the power draw. This results in a controlled reduction in power draw; it is a regulation process.

The zener diode 72 in the computer power draw adjust circuit 70 comprises a current blocking device that prevents the computer power draw adjust circuit from generating the PWM signal unless the voltage on conductor 18 through which current 80 flows has a voltage greater than a threshold voltage associated with the zener diode 72 (e.g., 6.8V).

As the notebook computer 20 reduces its power draw, the output current Iout provided by the power adapter will reduce to the point at which the voltage across sense resistor 54 is less than the threshold voltage of zener diode 55. At that point, the PNP transistor 56 starts to turn off, decreasing current 80 through the resistor 71 of the computer power draw adjust 70. When PNP transistor 56 turns off completely, the output voltage of comparator 74 becomes a constant high voltage which signals to the notebook computer that it no longer need actively reduce its power draw.

The combination of capacitor 52 and resistor 53 in the adapter control circuit 50 acts as an integrator that slows down the changes in current 80 to thereby slow down the notebook computer's attempts to alter its power consumption, and thereby stabilizes the control loop that controls power draw.

As described above, the notebook computer 20 causes a control signal to be generated between the power adapter 10 and load 20 which, in turn, causes the output voltage provided by the power adapter 10 to the notebook computer 20 to change, for example, to increase if the notebook computer 20 requires a higher voltage or to decrease if the notebook computer 20 is operable with a lower voltage. The circuitry that performs this functionality comprises circuitry in both the power adapter 10 and the notebook computer 20, namely the computer control circuit 60 working in concert with the adapter voltage adjust circuit 40.

The operational amplifier 41 in the adapter voltage adjust circuit 40 is configured as an error amplifier in the embodiment of FIG. 3. A voltage reference is provided to the non-inverting terminal of operational amplifier 41. Resistors 45-47 are connected in series to form a voltage divider network. The voltage across resistor 47 is coupled to the inverting terminal of the operational amplifier 41. The adapter voltage adjust circuit 40 generally functions to regulate the output voltage Vout of the power adapter 10. Current flows downward through the series combination of resistors 45-47. The values of resistors 45-47 are selected so that, at a nominal value of the adapter's output voltage Vout (e.g., 14 V), the voltage across resistor 47 is substantially equal to the reference voltage of zener diode 44, which is 2.5 V in the example of FIG. 3. If the power adapter's output voltage Vout deviates from its nominal voltage, the voltage across the resistor 47 will also change. Amplifier 41 amplifies the difference between the voltage across resistor 47 and the zener diode's reference voltage. This output error signal from operational amplifier 41 is provided to power circuitry (not specifically shown) in the power adapter 10 to adjust (e.g., increase or decrease) the power adapter's output voltage so as to reduce the error signal back to zero. If the output voltage from operational amplifier 41 decreases, the power adapter reacts by decreasing Vout. If the output voltage from operational amplifier 41 increases, the power adapter reacts by increasing Vout.

In some situations (e.g., for battery charging), the notebook computer 20 may require a different output voltage Vout from the power adapter 10. Logic in the computer control circuit 60 is used by the notebook computer 20 to cause the adapter voltage adjust circuit in the power adapter 10 to adjusts the output voltage of the adapter accordingly. Such logic may, for example, comprise the notebook computer's processor or analog circuitry. Such logic in the notebook computer 20 adjusts the potentiometer 62, which may comprise a digital potentiometer in some embodiments. The output voltage of the operational amplifier 61 equals or is proportional to the voltage provided on the operational amplifier's non-inverting terminal from the potentiometer 62.

As the logic in the notebook computer 20 adjusts potentiometer 62, transistor 63 (which comprises an NPN transistor) is turned on and a control signal current 85 flows through resistor 45 in the adapter voltage adjust circuit 40, through diode 48, through transistor 63 and resistor 64. Current 85, in addition to the current already flowing through resistors 45-47, increases the voltage drop across resistor 45. As a result, the voltage across resistor 47 decreases and the operational amplifier 41 generates a positive output voltage proportional to the difference between the voltage reference (zener diode 44) and the voltage across resistor 47. The adapter voltage adjust circuit 40 thereby causes the power adapter 10 to re-adjust (increase) its output voltage until the voltage across resistor 47 equals the zener diode's reference voltage. Current 85 causes the adapter voltage adjust circuit 40 to cause the adapter 10 to re-adjust the output voltage Vout. As the control current 85 decreases, the output voltage from operational amplifier 41 also decreases. Thus, logic in the notebook computer 20 can control the potentiometer 62 to thereby cause the power adapter 10 to increase or decrease its output voltage to the notebook computer 20.

The diode 48 in the power adapter 10 comprises signal blocking device disposed between the adapter control circuit 50 and the adapter voltage adjust circuit 40 to block the adapter control signal (current 80) from being received by the adapter voltage control adjust circuit 40. That is, the diode 48 precludes the current 80 from flowing to the adapter voltage adjust circuit 40, which otherwise would result in an unintended change to the power adapter's output voltage Vout when the adapter control circuit 50 was attempting to cause the notebook computer 10 to change its power draw.

In the event the adapter is requesting a decrease in load, while the notebook is requesting an increase in adapter voltage Vout, the current 80 sourced by adapter control circuit 50 is shared with current 85 that is drawn by computer control circuit 60. This tends to cancel out the effect of each request. As a result, the currents 80 and 85 are increased by their respective control circuits, until one reaches its maximum level, and is overdriven by the other. By design, the adapter control circuit 50 can drive current 80 to a higher level than the maximum of current 85 from computer control circuit 60. This way, overload of power adapter 10 is prevented. In this manner, the control circuits are able to operate simultaneously, and transition seamlessly between operating modes, without switching in new control logic or signals.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a computer;
 an external power adapter configured to be connected to said computer to provide power to said computer;
 wherein said computer comprises a computer control circuit that generates a computer control signal that is provided to said external power adapter and causes a change in an output voltage of said external power adapter, and wherein said external power adapter comprises an adapter control circuit that generates an adapter control signal that is provided to said computer and causes the computer to change its power draw; and
 wherein said computer and adapter control circuits generate said control signals on a common conductor interconnecting the computer and the external power adapter;
 wherein the adapter control signal modulates a periodic signal to form a pulse width modulated signal to control the power draw of the computer.

2. The system of claim 1 further comprising a computer power draw adjust circuit provided in said computer and coupled to said common conductor, wherein said computer power draw adjust circuit generates a computer power draw adjust signal based on said adapter control signal, said computer power draw adjust signal controls the power draw of the computer.

3. The system of claim 2 wherein said computer power draw adjust circuit comprises a current blocking device that prevents said computer power draw adjust circuit from generating said power draw adjust signal unless the adapter control signal has a voltage greater than a threshold voltage associated with said current blocking device.

4. The system of claim 2 wherein said adapter control circuit comprises a current sense device that generates a sense signal proportional to a current draw of said computer, said sense signal causing said adapter control circuit to source current to said computer power draw adjust circuit if said current draw of said computer exceeds a rating of said external power adapter.

5. The system of claim 2 wherein said adapter control signal modulates a periodic signal to form a pulse width modulated signal comprising said computer power draw adjust signal.

6. The system of claim 1 further comprising an adapter voltage adjust circuit provided in said external power adapter and coupled to said common conductor, wherein said adapter voltage adjust circuit generates an adapter voltage control adjust signal based on said computer control signal, said adapter voltage control adjust signal controls the output voltage level of the external power adapter.

7. The system of claim 6 further comprising a signal blocking device disposed between the adapter control circuit and the adapter voltage adjust circuit to block the adapter control signal from being received by the adapter voltage control adjust circuit from the adapter control circuit.

8. The system of claim 6 wherein said computer control circuit comprises a variable output device that causes a current to flow through said common conductor from the adapter voltage adjust circuit to the computer control circuit to thereby cause said adapter voltage adjust circuit to cause the external power adapter's output voltage to change.

9. The system of claim 1 wherein said adapter control signal has higher priority over said computer control circuit such that said adapter control circuit causes the computer to reduce its power draw even if the computer control signal generated by the computer control circuit otherwise directs the external power adapted to increase its output voltage.

10. The system of claim 1 wherein said control signals simultaneously co-exist on the common conductor.

11. An apparatus, comprising:
 an adapter control circuit that generates an adapter control signal that is provided to a computer via a conductor, said adapter control signal causes the computer to change its power draw; and
 an adapter voltage adjust circuit coupled to said conductor over which said computer causes a computer control signal to be provided, said computer control signal causes a change to occur in an output voltage of said apparatus;
 wherein said output voltage of said apparatus powers a load; and
 wherein the adapter control signal modulates a periodic signal to form a pulse width modulated signal to control a power draw of the computer.

12. The apparatus of claim 11 further comprising a signal blocking device disposed between the adapter control circuit and the adapter voltage adjust circuit to block the adapter control signal from being received by the adapter voltage control adjust circuit from the adapter control circuit.

13. The apparatus of claim 11 wherein said signal blocking device comprises a diode.

14. The apparatus of claim 11 wherein said adapter control circuit comprises a current sense device that generates a sense signal proportional to a current draw of said load, said sense signal causing said adapter control circuit to source current to said load if a current draw of said load exceeds a rating of said apparatus.

15. An apparatus, comprising:
 a computer control circuit that causes a computer control signal to be generated and provided over a conductor to an external power adapter, said computer control signal causes a change in an output voltage of said external power adapter; and
 a computer power draw adjust circuit that receives an adapter control signal from the external power adapter via said conductor and, in response to said adapter control signal, adjusts the power draw of said apparatus;
 wherein the adapter control signal modulates a periodic signal to form a pulse width modulated signal to adjust the power draw of the apparatus.

16. The apparatus of claim 15 wherein said computer power draw adjust circuit generates a power draw adjust signal based on said adapter control signal, said computer power draw adjust signal controls the power draw of the computer.

17. The apparatus of claim 16 further comprising a current blocking device which prevents said computer power draw adjust circuit from generating said power draw adjust signal unless the adapter control signal has a voltage greater than a threshold voltage associated with said current blocking device.

18. The apparatus of claim 15 wherein said computer power draw adjust circuit modulates a periodic waveform using said adapter control signal to generate a pulse width modulated power draw adjust signal, said computer power draw adjust signal controls the power draw of the computer.

19. The apparatus of claim 15 wherein said computer control circuit comprises a variable output device that pauses the computer control signal to be generated.

* * * * *

UNITED STATES PATENT AND TRADEMARK OFFICE
CERTIFICATE OF CORRECTION

PATENT NO. : 8,190,933 B2  
APPLICATION NO. : 12/598236  
DATED : May 29, 2012  
INVENTOR(S) : Thomas P. Sawyers Page 1 of 1

It is certified that error appears in the above-identified patent and that said Letters Patent is hereby corrected as shown below:

In column 8, line 63, in Claim 19, delete "pauses" and insert -- causes --, therefor.

Signed and Sealed this
Fourth Day of December, 2012

David J. Kappos
*Director of the United States Patent and Trademark Office*